United States Patent [19]

Wuertele

[11] 4,179,745
[45] Dec. 18, 1979

[54] THERMOCOUPLE LINEARIZER CIRCUIT

[75] Inventor: James W. Wuertele, Sunnyvale, Calif.

[73] Assignee: Gentran, Inc., Sunnyvale, Calif.

[21] Appl. No.: 910,766

[22] Filed: May 30, 1978

[51] Int. Cl.$^2$ ............................................. G01K 7/14
[52] U.S. Cl. .................................. 364/571; 364/573; 364/557; 73/359 R; 73/362 R; 324/105
[58] Field of Search ............... 364/571, 573, 557, 852; 73/362 R, 362.4, 362.7, 361, 359 R, 1 F, 362 AR, 765; 324/105, 130; 328/156, 162, 184; 307/229, 231, 263

[56] References Cited

U.S. PATENT DOCUMENTS

| | | | |
|---|---|---|---|
| 2,871,701 | 2/1959 | Knudsen | 73/361 |
| 2,896,082 | 7/1959 | Raymond et al. | 364/852 |
| 3,515,343 | 6/1970 | Schwartzenberg et al. | 364/571 |
| 3,650,154 | 3/1972 | Arnett et al. | 73/361 |
| 3,736,515 | 5/1973 | Kadron et al. | 307/229 |
| 3,903,743 | 9/1975 | Noller | 73/359 |
| 3,921,453 | 11/1975 | Platzer, Jr. | 73/361 |
| 4,000,643 | 1/1977 | Pearson | 364/571 |
| 4,060,715 | 11/1977 | Scott | 364/557 |
| 4,084,437 | 4/1978 | Finnegan | 73/362.4 |
| 4,102,199 | 7/1978 | Tsipouras | 73/362 AR |
| 4,120,201 | 10/1978 | Wargo | 73/361 |

Primary Examiner—Malcolm A. Morrison
Assistant Examiner—Gary Chin
Attorney, Agent, or Firm—Flehr, Hohbach, Test et al.

[57] ABSTRACT

A thermocouple linearizer circuit for use in a device for digitally displaying the temperature of a thermocouple. The circuit includes a plurality of proportional correction means, each connected to receive a non-linear electrical signal representing the temperature of a thermocouple. The correction circuits generate a correction signal proportional to the difference between a non-linear electrical signal and a predetermined reference signal. The correction signals are initiated when the non-linear signal exceeds the respective reference signal in each correction circuit. An arithmetic unit is included for adding the correction signals and the non-linear signal thereby forming a signal corresponding to a linear function of the temperature of the thermocouple.

8 Claims, 5 Drawing Figures

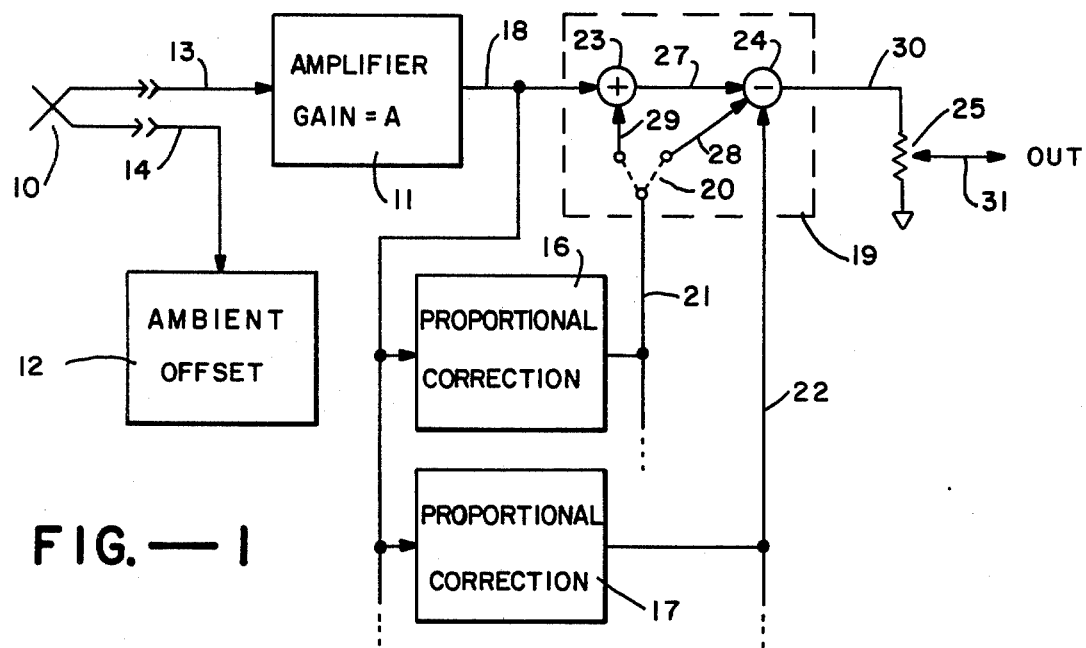
FIG.—1
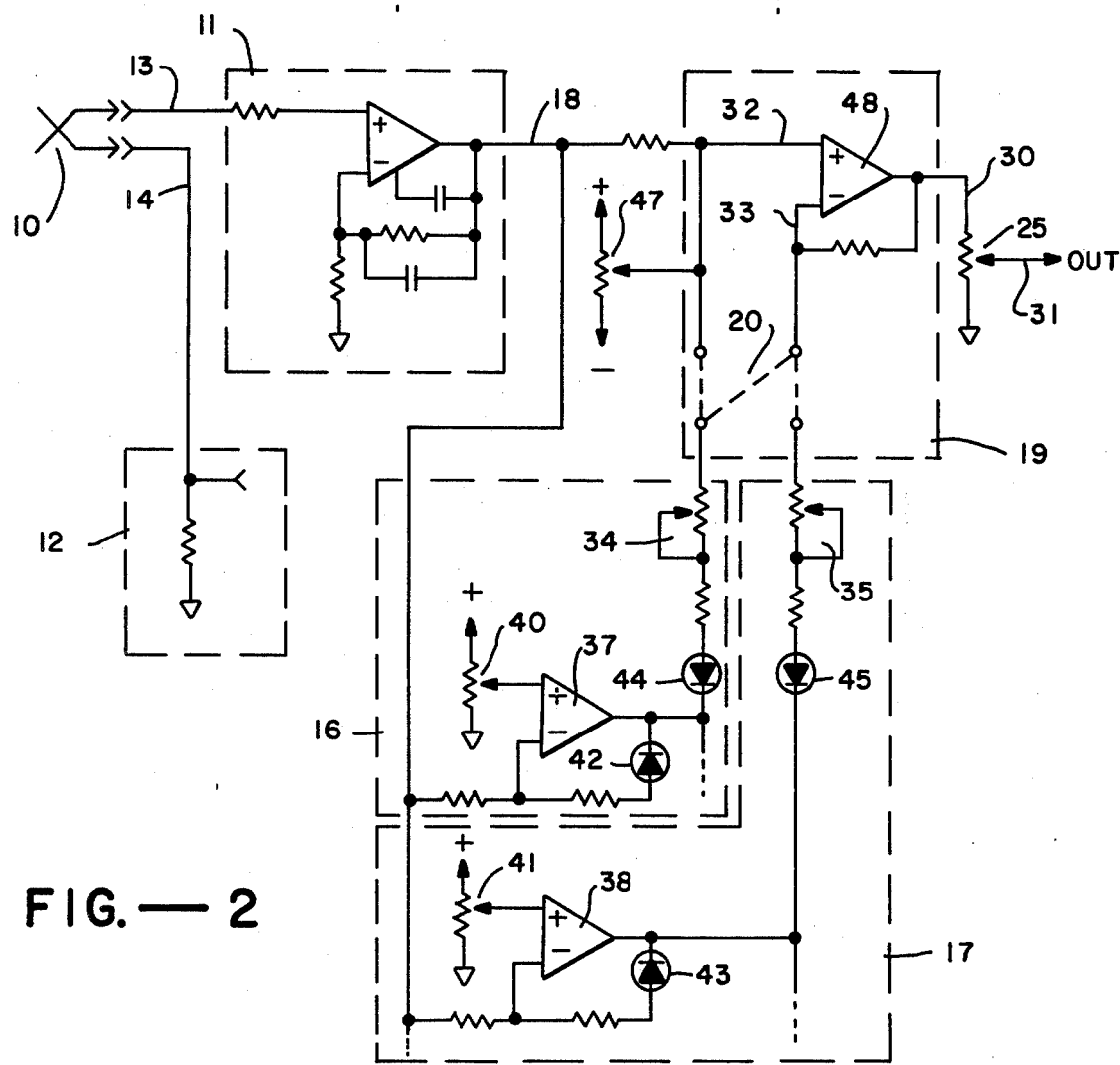
FIG.—2

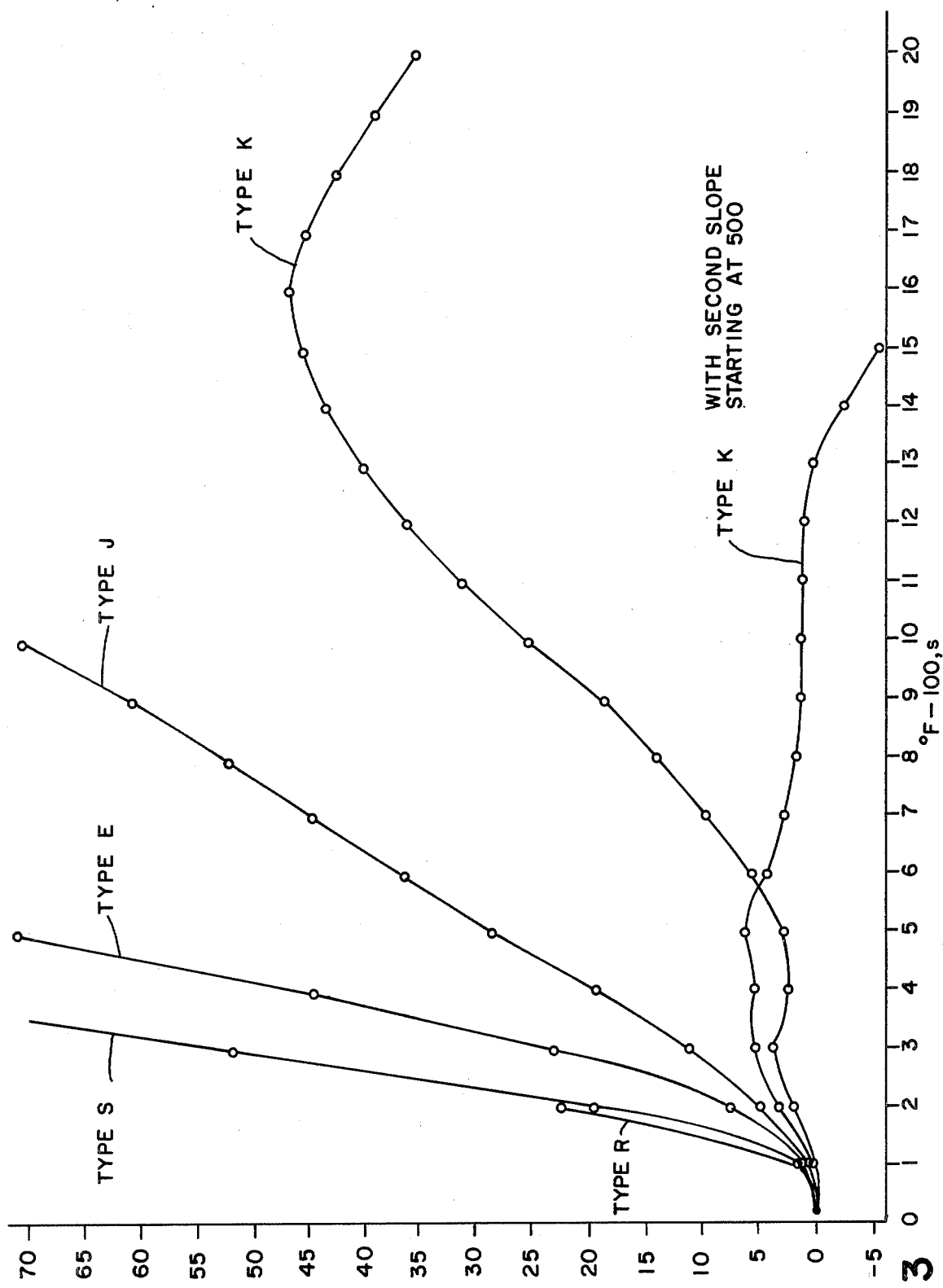
FIG.—3

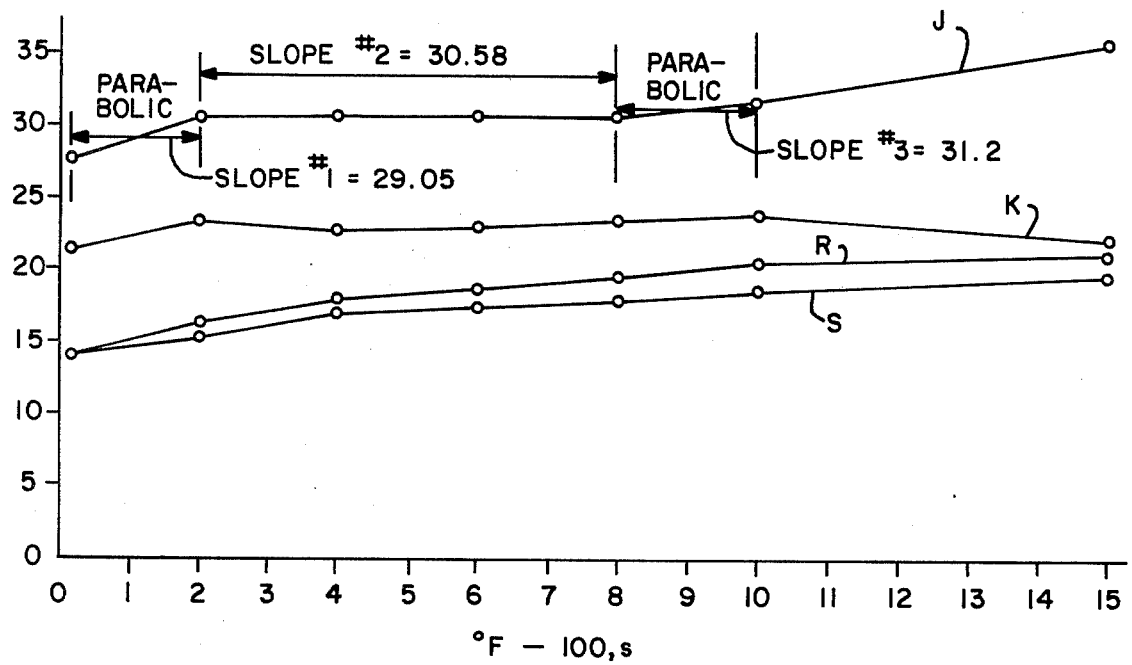
FIG.—4
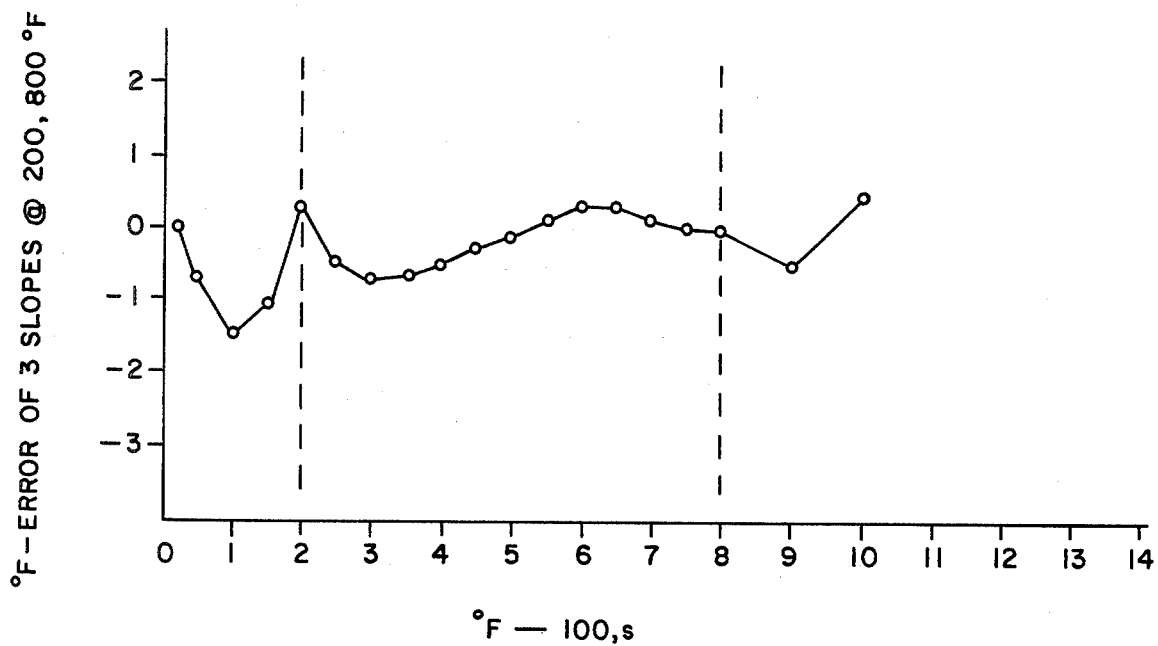
FIG.—5

THERMOCOUPLE LINEARIZER CIRCUIT

BACKGROUND OF THE INVENTION

The present invention relates to a thermocouple linearizer circuit for use in a device for digitally displaying the temperature of a thermocouple.

A thermocouple is a device that uses the voltage developed by the junction of two dissimilar metals to measure temperature differences. Two wires of dissimilar metals welded together at one end make up the basic thermocouple. This junction, called the sensing or measuring junction, is placed at the point where the temperature is to be measured. The other junction, called the reference or cold junction, is maintained at a known reference temperature. The voltage developed between the cold junction ends depends on the difference between the temperatures of the two junctions.

The prior art has generally not been required to be accurate, stable or as repeatable as is now required for digital display applications using thermocouples.

In order to display temperatures, previous methods have included the use of a diode switch inside an amplifier, but the temperature stability of diodes generally limits the accuracy when used with a device for digitally displaying the temperature.

Another method is digital linearization, in which an actual response curve representing the particular thermocouple temperature is digitized and stored in a random access memory. Digital linearization generally provides acceptable accuracy for a digital display but has the disadvantage of requiring sufficient memory capacity to properly represent the temperature over the range of the particular thermocouple, resulting in a corresponding increase in the cost of the device.

Another method is to incorporate multiplicative correction of the slope of the response curve of a thermocouple, which is initiated generally at low levels in a feedback loop of an input amplifier and using diodes as switching or non-linear elements. This method is described in an article entitled "Thermocouple Output Voltage Linearizer" by A. J. Haywood, *Electronic Engineering*, November, 1974, p. 36. However, a problem with multiplicative techniques is that a correction of the thermocouple by multiplication at a low level can result in multiplication of any random error signal, thereby decreasing the accuracy.

In view of the above background, it is an objective of the present invention to provide an improved thermocouple linearizer circuit which is relatively inexpensive, requires few parts, is quickly adjustable, and is stable over the broad temperature range for a number of thermocouples and provides the necessary accuracy for applications using thermocouples such as for a digital display.

SUMMARY OF THE INVENTION

The present invention relates to a thermocouple linearizer circuit and method for use in a digital display device for displaying the temperature of a thermocouple.

In one embodiment, the circuit includes a plurality of proportional correction circuits connected to receive a nonlinear electrical signal representing the temperature of the thermocouple. The correction circuits generate a correction signal proportional to the difference between the non-linear electrical signal and a predetermined reference signal. The correction signals are initiated when the non-linear signal exceeds the respective reference signal in each correction circuit. An arithmetic unit is included for adding the correction signal and the non-linear signal thereby forming a linear signal corresponding to the temperature of the thermocouple.

In another embodiment, the linearizer circuit includes amplifier means connected to receive a non-linear electrical signal representing the temperature of a thermocouple for amplifying the electrical signal to form a first amplified signal representing the non-linear signal. A proportional correction circuit is connected to receive the amplified signal for generating a correction signal proportional to the difference between the amplified non-linear signal and a first predetermined reference signal. The correction signal is generated when the amplified non-linear signal exceeds the reference signal. Arithmetic means are included for adding the correction signal and the nonlinear amplified signal thereby forming a linear electrical signal corresponding to the temperature of the thermocouple.

In accordance with the above summary, the present invention achieves the object of providing an improved thermocouple linearizer circuit and method for use in a digital display device.

Additional objects and features of the invention will appear from the description in which the preferred embodiments of the invention have been set forth in detail in conjunction with the drawings.

DESCRIPTION OF THE DRAWINGS

FIG. 1 depicts a block diagram of a linearizer circuit according to the present invention.

FIG. 2 depicts an electrical schematic diagram of a linearizer circuit of FIG. 1.

FIG. 3 depicts plot of non-linear temperature functions for typical thermocouples.

FIG. 4 depicts a plot of slope of non-linear temperature functions for typical thermocouples.

FIG. 5 depicts a plot of the error of a linearized temperature function of the present invention for a Type J thermocouple in degrees Fahrenheit.

DESCRIPTION OF THE PREFERRED EMBODIMENT

Referring now to FIG. 1, there is shown therein a block diagram of a linearizer circuit according to the present invention.

The thermocouple 10 input to the circuit is zero when both ends are at the same temperature. Therefore, an ambient offset circuit 12, well known in the art, adds enough voltage to the thermocouple 10 input to have the output read room ambient temperature. Such correction is usually called cold junction compensation.

The output of thermocouple 10 is a non-linear electrical signal connected via bus 13 to amplifier 11, typically a conventional operational amplifier for amplifying the non-linear signal, which is generally in microvolts, to millivolts. Typical non-linear temperature functions for Type R, S, E, J, and K thermocouples in degrees F are depicted in FIG. 3, and are well known in the art.

In FIG. 1, the amplified thermocouple signal is output on bus 18 into arithmetic unit 19 and to a plurality of proportional correctional circuits 16, 17 and additional correction circuits, as necessary.

Proportional correction circuits 16, 17 receive the output of amplifier 11 and operate to generate a correction signal on buses 21, 22 which is proportional to the difference between the signal on bus 18 and a first predetermined reference voltage for each correction circuit 16, 17. The correction signals on buses 21, 22 are initiated when the signal on bus 18 exceeds the respective reference level. For example, when the output level on bus 18 exceeds or is equal to the reference voltage for each of the correction circuit 16, a correction signal is initiated on bus 21.

The arithmetic unit 19 is connected to receive the proportional corrective signals on buses 21, 22 and the output signal on bus 18 for adding (or subtracting, as necessary) the signals thereby forming a linear voltage function with respect to the temperature of the thermocouple.

In FIG. 1, amplifier 11 amplifies the non-linear signal on bus 13 to an amplified signal having a level of about one millivolt per degree F. The amplified signal is used to operate the proportional correction circuits 16, 17. Circuits 16, 17 are used to compensate for the change in slope of the thermocouple temperature function as shown in FIGS. 3 and 4. Since these corrections are slope corrections, parabolic portions of the temperature function are corrected by an average correction.

FIG. 3 is a plot of the °F. error from a straight line vs. temperature in °F. of typical thermocouples. As can be seen in FIG. 3, as the temperature of a particular thermocouple increases, the °F. error from a straight line at 32° F. (the Y-axis) increases non-linearly. The present invention compensates for this non-linearity.

FIG. 4 shows a plot of non-linear temperature function with three slopes for a Type J thermocouple, in the range of 100°-1000° F. The gain of amplifier 11 and the two proportional correction circuits 16, 17 compensate for these three slopes in FIG. 4. For the Type J thermocouple, the average slopes were calculated to be: 29.05 between 32° and 200° F.; 30.58 between 200° and 800° F.; and 31.2 between 800° and 1000° F. The compensation calculated for the Type J thermocouple and the expected error for perfect correction is plotted in FIG. 5. The sense of direction is determined by the addition and subtraction points 23, 24 in arithmetic unit 19, which are connected to proportional circuits 16, 17 via buses 21, 22.

In one embodiment, a Type J thermocouple requires two negative corrections (one at 200° F. and the other at 800° F.) and a Type K thermocouple requires one positive and one negative correction (the negative at 600° F. and the positive at 1400° F.). Therefore, strapping circuit 20 is utilized to provide this different compensation for the different type of thermocouples and can be adjusted easily for the particular thermocouple.

Each proportional correction circuit 16, 17 and other correction circuits, as utilized, incorporate a level sensitive switch which determines the exact temperature at which proportion correction begins. Below this temperature, the correction is zero.

The output potentiometer circuit 25 converts degrees F. to degrees C. on to bus 31, as required. The output of the linearizer circuit of FIG. 1 can be utilized in digital display devices well known in the art for digitally representing with sufficient accuracy the temperature of the thermocouple.

Referring now to FIG. 2, a schematic representation of FIG. 1 is shown therein. Amplifier 11 is in one embodiment a conventional 725 type operational amplifier with less than 3 microvolts per degree C. drift. With a 10 degree C. change, such a drift will cause less than one degree F. change at the output. The output level of amplifier 11 onto bus 18 is about one millivolt per degree F., plus expected variations in resistor values which is taken up by output potentiometer 25.

The proportional correction currents on buses 21, 22 are injected into arithmetic unit 19 into points 32, 33. The currents are developed by the voltage drops across conventional trimmers 34, 35 respectively. Each voltage is generated by conventional op amps 37, 38 with an input which is proportional to the uncorrected signal on bus 18 subtracted from a fixed signal which is a reference voltage signal determined by trimmers 40, 41 respectively.

Therefore, at some temperature in the range of both proportional correction circuits 16, 17, the correction current at points 32, 33 depends on trimmers 34, 35 and 40, 41 respectively.

The onset of correction, that is, where correction increases linearly from zero, is determined only by trimmers 40, 41. If the voltage on bus 18 is below the onset of correction, the diodes 42, 43 in the feedback loop of amplifiers 37, 38 cause the amplifier outputs to be at the most positive limit. This exaggerated condition is sufficient to guarantee that the series diodes 44, 45 connected to the trimmers 34, 35 prevent any correction current.

In FIG. 2, trimmer 47 is used to compensate for any offset voltage error which may occur in amplifier 48, which acts as a buffer amplifier. Offset current changes (temperature) of the amplifiers contribute negligible errors. Offset voltage errors of amplifiers 37, 38 are compensated for by trimmers 40, 41 respectively. Offset voltage error of amplifier 11 is compensated for by the cold junction compensation already described. Therefore, amplifiers such as a 324 type, which is generally very low cost, are used for amplifiers 48, 37 and 38, which as a result saves money with little or no penalty in performance.

After the cold junction is adjusted for ambient temperature in millivolts on bus 18, trimmer 47 is adjusted for the same at the output of amplifier 48. Then, with the thermocouple input set for the equivalent of, for example, 190° F., the output trimmer 25 is set for 190 millivolts, which sets the overall gain. Trimmers 40, 41 are then set to initiate correction as required. In one embodiment for a Type J thermocouple, 200° F. and 800° F. are used. The correction trimmers 34, 35 are set for accurate outputs at other temperatures at trimmer 25. For a Type J thermocouple, 500° F. and 1000° F. are used. The compensation adjustments are complete and typical accuracy using theoretical thermocouple inputs for Type J is ±1° after adjustment, as depicted in FIG. 5.

In one embodiment for a Type J thermocouple, as the temperature of the thermocouple 10 is increasing, the voltage signal on bus 13 is input to amplifier 11 which generates the non-linear signal on bus 18. The voltage on bus 18 is below 200° F. initially and therefore proportional correction circuits 16, 17 have not generated the correction signals on buses 21, 22. The output signal on bus 31 is the output of the arithmetic means 19 at this time and corresponds to the plot depicted in FIG. 5 between 0° F. and 200° F. As the temperature of the thermocouple increases above 200° F., proportional correction circuit 16 generates the correction signal on bus 21, which when subtracted in arithmetic means 19 with the signal on bus 18 forms the linearized temperature function signal in FIG. 5 between 200° F. and 800° F. As the temperature continues to increase above 800°

F., proportion correction circuit 17 will initiate a correction signal on bus 22 and when subtracted with the control signal on bus 18 and first correction signal on bus 21 will form the linearized voltage signal above 800° F., as depicted on FIG. 5.

In the illustrative embodiment for the Type J thermocouple, the gain of amplifier 11 was 34.295 and the proportional correction circuits 16, 17 had subtraction functions of $-1.722$ and $-0.217$, respectively, which were utilized for generating the plot depicted in FIG. 5. It should be observed in FIG. 5 that the linearizer circuit described herein can provide $\pm 1°$ F. accuracy over a broad temperature range for a Type J thermocouple. The circuit can easily be implemented for other types of thermocouples, providing a proportional type of accuracy.

While a thermocouple linearizer circuit has been shown for use in for example a digital display which has the advantages of inexpensive circuitry, quick adjustment and stability over a large ambient temperature range for various types of thermocouple circuits, the linearizer circuit could be utilized in other applications, such as in other sensing circuits as long as the linearizing circuit provides a suitable response to the particular input sensing signal.

What is claimed is:

1. A thermocouple linearizer circuit comprising:
   proportional correction means connected to receive a non-linear electrical signal representing the temperature of a thermocouple for generating a linearization correction signal proportional to the difference between said electrical signal and a first predetermined reference signal, said linearization correction signal being generated when said electrical signal exceeds said reference signal, and
   arithmetic means for adding said correction signal and said electrical signal thereby forming a linear signal corresponding to the temperature of said thermocouple.

2. A thermocouple linearizer circuit for use in a digital display device comprising:
   a plurality of proportional correction means connected to receive a non-linear electrical signal, each of said linearization correction means including means for generating a correction signal proportional to the difference between said non-linear signal and a predetermined reference signal, said linearization correction signals being generated when said non-linear signal exceeds said reference signal, and
   arithmetic means for adding said correction signals and said non-linear signals thereby forming a linear signal corresponding to the temperature of said thermocouple.

3. A circuit as in claim 2 further including amplifier means connected to receive said non-linear electrical signal for amplifying said electrical signal thereby forming an amplified non-linear signal.

4. A circuit as in claim 3 wherein each of said correction means includes first trimmer means for generating said reference signal,
   second amplifier means connected to receive said reference signal and to receive said amplified non-linear signal for initiating said correction signal,
   second trimmer means connected to said second amplifier means for controlling the value of said proportional correction signal, and
   diode means connected to said second amplifier means and to said second trimmer means for preventing said correction signal when said electrical signal is below said reference signal.

5. A circuit as in claim 3 wherein said arithmetic means includes means for adding the correction signals from each of said correction means.

6. A circuit as in claim 3 wherein said arithmetic means includes means for subtracting said correction signals from each of said correction means.

7. A linearizer circuit comprising:
   proportional correction means connected to receive a non-linear electrical signal representing the temperature of a thermocouple for generating a correctional signal proportional to the difference between said non-linear signal and a first predetermined reference signal, said linearization correction signal being generated when said non-linear signal exceeds said reference signal, and
   arithmetic means for adding said correction signal and said non-linear signal thereby forming a linear signal corresponding to said electrical signal.

8. In a thermocouple linearizer circuit for use in a digital display device, the method comprising the steps of:
   generating a linearization correction signal proportional to the difference between a non-linear electrical signal representing the temperature of a thermocouple and a first predetermined reference signal, said correctional signal being generated when said electrical signal exceeds said reference signal, and
   adding said linearization correction signal and said electrical signal thereby forming a linear electrical signal corresponding to the temperature of said thermocouple.

* * * * *